United States Patent [19]

Saito et al.

[11] 4,085,595
[45] Apr. 25, 1978

[54] DOUBLE EFFECT ABSORPTION REFRIGERATING SYSTEM

[75] Inventors: Shozo Saito; Naoyuki Inoue, both of Yokohama, Japan

[73] Assignee: Ebara Manufacturing Co., Ltd., Tokyo, Japan

[21] Appl. No.: 752,661

[22] Filed: Dec. 20, 1976

[30] Foreign Application Priority Data

Dec. 29, 1975 Japan .................................. 50-156358

[51] Int. Cl.[2] ........................ F25B 15/00; F25B 33/00
[52] U.S. Cl. ...................................... 62/476; 62/489; 62/497
[58] Field of Search .............. 62/101, 148, 476, 497, 62/489

[56] References Cited

U.S. PATENT DOCUMENTS

| | | | |
|---|---|---|---|
| 3,175,371 | 3/1965 | Harwich | 62/497 |
| 3,495,420 | 2/1970 | Loweth et al. | 62/497 |
| 3,530,684 | 9/1970 | Porter | 62/497 |
| 3,540,231 | 11/1970 | Porter et al. | 62/497 |
| 3,550,394 | 12/1970 | Peckham | 62/497 |
| 3,605,432 | 9/1971 | Wada | 62/476 |
| 3,651,654 | 3/1972 | Rachfal | 62/476 |
| 3,710,852 | 1/1973 | Porter | 62/476 |
| 3,717,007 | 2/1973 | Kuhlenschmidt | 62/476 |
| 3,721,109 | 3/1973 | Porter | 62/476 |

*Primary Examiner*—Lloyd L. King
*Attorney, Agent, or Firm*—Wenderoth, Lind & Ponack

[57] ABSTRACT

A double effect absorption system having improved thermal efficiency is provided wherein a part of a weak solution fed from an absorber to a high pressure or first generator is bypassed to a second generator and the bypassed solution is transferred with the heat energy from refrigerant passed through a tube within a low pressure or second generator.

13 Claims, 5 Drawing Figures

DOUBLE EFFECT ABSORPTION REFRIGERATING SYSTEM

FIELD OF THE INVENTION

The present invention is related to a double effect absorption refrigerating system employing a plurality of generators and using a refrigerating medium and an absorbing liquid and more particularly to an improvement for utilizing heat energy which has heretofore been wasted by being discharged into the coolant in the system.

BACKGROUND OF THE INVENTION

Several double effect absorption refrigerating systems are known wherein a heated refrigerating medium is utilized to heat water or the like for several purposes in parallel with the refrigerating cycle.

For example, there are several U.S. Patents relating to double effect refrigeration such as U.S. Pat. Nos. 3,605,432; 3,651,654; 3,292,385; 3,530,684; and 3,266,266. However, in each of the systems disclosed in these prior art publications, heat energy in a refrigerant discharged from a low pressure generator or a second generator was lost or was discharged without being used by merely passing the vaporized refrigerant or liquid refrigerant carrying the heat energy through a liquid sealing portion or trap into a cooling medium or water thereby wasting the heat energy without utilizing such energy to improve the efficiency of the refrigerating cycle.

Also, Japanese Patent No. 647,515 issued to Hitachi Ltd. is known as prior art in this field; however, this is intended to avoid the problem of crystallization in a double effect absorption type refrigerator by parallely flowing the solution to a high pressure generator and a low pressure generator and returning the refrigerant to an absorber and there is no teaching to utilize the wasted heat energy discussed above.

Therefore, it has been desired to prevent such waste of heat energy thereby lowering the operating cost and improving the efficiency of the refrigeration cycle.

SUMMARY OF THE INVENTION

Accordingly, it is an object of this invention to provide a double effect refrigerating system wherein the economic disadvantages of the prior art discussed above are obviated and the efficiency of the system is remarkably increased by recovering and utilizing the heat energy heretofore wasted.

It is another object of the present invention to provide a double effect absorption refrigerating system wherein a solution in a low pressure generator or a second generator is strengthened without reducing but, instead, increasing the efficiency of the system by bypassing a weak solution through a heat exchanger to the low pressure generator.

It is a further object of the present invention to provide a double effect absorption refrigerating system wherein the heat transferring efficiency of a low pressure generator is improved.

It is also another object of the present invention to provide a double effect absorption refrigerating system wherein the concentration of the strong solution at the discharge port of a low pressure generator is relatively lowered by the bypassing referred to above thereby dissipating or minimizing the possibility of the occurence of a critical condition of crystallization of the strong solution and assuring the safe operation of the system.

According to the present invention, the objects above are achieved by a system wherein a portion of a weak solution fed from an absorber to a high pressure or first generator is bypassed to a low pressure or second generator and the bypassed solution is passed through an additional heat exchanger in which the bypassed solution receives heat energy from the refrigerant passed through a tube within the second generator thereby improving the thermal efficiency of the cycle.

The present invention and its advantages will be further clarified by the description of the preferred embodiments which follows the brief explanation of the drawings below.

Figure 1:
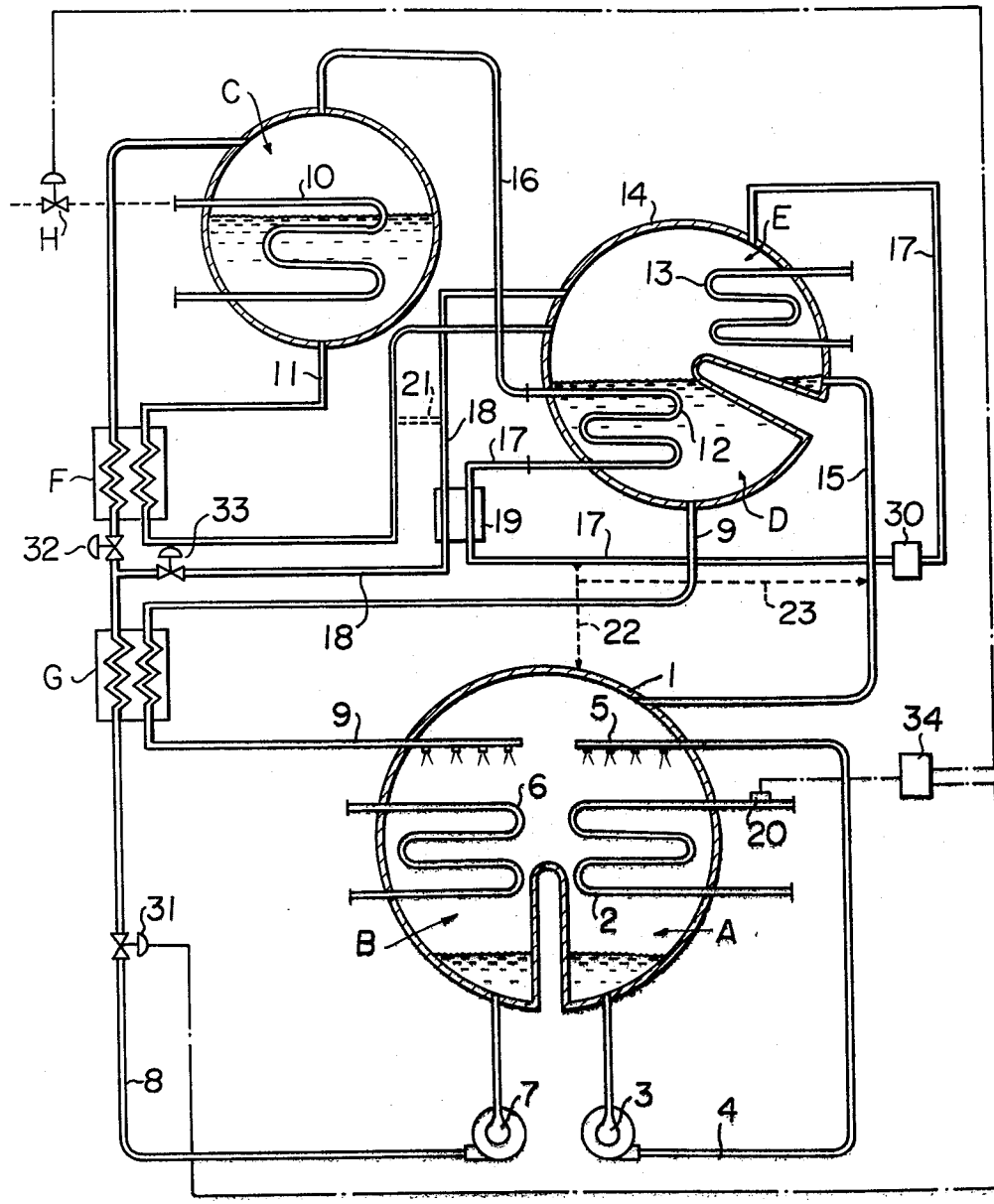
FIG. 1 is a schematic illustration of a system representing one of the preferred embodiments of the present invention.

The present invention will be explained hereinafter in detail referring to the drawings above.

DETAILED DESCRIPTION OF THE PREFERRED EMBODIMENTS

In the system illustrated in FIG. 1, there are provided an evaporator A, an absorber B, a first or high pressure generator C, a second or low pressure generator D, a condenser E and solution heat exchangers F and G wherein a vaporized refrigerant is directed from the first generator C to the second generator where the vapor is condensed and the refrigerant thus condensed or the mixture of the condensed refrigerant and the vapor is thence transmitted to the evaporator A through the condenser E.

The evaporator A is, in the embodiment of FIG. 1, preferably constructed together with the absorber B within a single drum 1 and is provided with a chilled water passage 2 and a refrigerant passage 4 having therein a refrigerant pump 3 and a spray header 5. The absorber B is provided with a cooling medium or water passage 6 and this absorber B is interconnected with the first generator C and the second generator D by means of a feed or weak solution passage 8 and a return or strong solution passage 9, respectively. The outlet end of the passage 9 is preferably provided with a spray header. The weak solution is fed by a solution pump 7 provided in the passage 8 and the solution fed passes a low stage or second heat exchanger G and a high stage or first heat exchanger F provided in the passage 8 to the first generator C. The generator C is provided with a heat generating tube 10 accompanied with a heat energy control valve H. The generator C is connected to a second generator D through a solution return passage 11 which is arranged to pass through the first heat exchanger F while the solution return passage 9 for the strong solution is arranged to pass through the second heat exchanger G. The heat exchangers F and G are provided for improving the thermodynamic efficiency of the cycle.

The second generator D is provided with a generator tube 12 in which the refrigerant is fed from the first generator C to the second generator D through a refrigerant vapor passage 16 coupled with the tube 12. As schematically shown, the generator D is preferably formed within a single drum 14 in which the condenser E is formed so as to communicate with the generator D. However, the condenser E may be disposed outside of the drum provided that the communication with the second generator D is maintained. The condenser E is provided with a condenser tube 13 and is coupled with a line 17 which is connected with the generator tube 12 and the refrigerant is directed from the second generator D, wherein the refrigerant heats the solution in the second generator by means of the tube 12, to the condenser E through a liquid sealing device 30 in the line 17. The refrigerant is further transferred from the condenser E to the evaporator through a passage 15.

Further a bypass line 18 is provided so as to bypass the weak solution running through the passage 8 to a second generator D. A third heat exchanger 19 is provided through which the bypass line 18 and the refrigerant line 17 pass through so as to effect a heat exchanging operation between the line 18 and line 17. the heat energy is naturally transmitted from the line 17 towards line 18 by which the energy heretofore wasted is recovered. Although, a main valve 31 is provided in the passage 8, there are provided valves 32 and 33 in the passage 8 and in the line 18, respectively so as to control the respective flow rates of the weak solution directed to the first generator C and the second generator D, the latter receiving the weak solution which has passed the heat exchanger 19 wherein the heat energy from the refrigerant in liquid state, vapor state or a mixture of the two states is transferred to the weak solution bypassed to the second generator D. The valve 31 can be omitted since the valves 32 and 33 may perform the alternate function of the main valve 31.

The bypass line 18 is preferably coupled to the passage 8 downstream of the second heat exchanger G and upstream of the first heat exchanger F.

From the foregoing explanation, the operation of the cycle might be evident; however, for convenience, the operation of the system illustrated in FIG. 1 is briefly explained below.

The refrigerant evaporated in the evaporator A is absorbed into the solution in the absorber B and this weak solution is delivered by means of the pump 7 to the first generator C through the heat exchangers G and F. The solution is heated by means of the tube 10 in the first generator C and the refrigerant is discharged from the solution as vapor and directed to the second generator D through the passage 16. In the second generator D, the refrigerant heats the solution therein while flowing through the generator tube 12 as explained before and is directed, through the line 17 having the third heat exchanger 19 and the sealing device 30 therein, to the condenser E in the liquid state. On the other hand, the solution strengthened in the generator C is directed through the return passage 11 to the first heat exchanger F where the heat energy of the solution is transmitted to the solution flowing from the absorber B to the first generator C. After the heat transfer at the first heat exchanger F, the solution is fed to the second generator where the solution is further strengthened by means of the generator tube 12 to discharge the refrigerant as vapor. The vapor generated in the second generator enters the condenser E where it is condensed by a coolant flowing through the tube 13. The solution in the second generator is fed to the second heat exchanger G through the return passage 9 and the temperature of the solution is lowered by the heat transfer at the second heat exchanger. The solution is, thence, returned to the absorber B through the passage 9. On the other hand, the refrigerant accumulated in the condenser E is returned to the evaporator A through the passage 15. By carrying out the operation described above, the double effect refrigerating cycle can be repeated.

By the provision of the bypass line 18 and the third heat exchanger 19, the proper amount of the weak solution is bypassed and directed to the third heat exchanger 19 wherein it receives heat energy from the refrigerant flowing in the line 17 either in the liquid state or vapor state or a mixture of the both whereby the heat energy corresponding to that recovered at the third heat exchanger 19 is saved at the heat source of the first generator C and this makes it possible to reduce the total energy consumed in the cycle thereby improving the thermal efficiency of the cycle.

As illustrated in FIG. 1, the bypass line 18 may be connected to the return passage 11 by a communicating line 21 instead of being directly coupled to the drum 14 or the second generator D.

As to the flow line of the refrigerant discharged from the generator tube 12 having a high temperature, it may be, after the heat exchanging at the third heat exchanger 19, directly returned to the evaporator A by provision of a passage 22 or merged into the return passage 15 from the condenser E, if necessary by provision of a passage 23.

Although in the illustrated preferred embodiment in FIG. 1, the external heat source employed is a medium such as steam or hot water flowing through the generator tube 10, any other external heat source such as one burning gas, oil etc. may be utilized as the heat source and, in this regard, the explanation or the embodiment is no way to be considered as limiting the scope or application of the present invention.

In the operation of the system, the operating conditions are naturally variable, depending on the load to be cooled by the system, the atmospheric temperature and so on. Therefore, the amount of the external heat energy supplied to the first generator is preferably varied according to such factors. To such end, in the system illustrated in FIG. 1, there is provided a temperature detector 20 disposed in the outlet line of the chilled water passage 2. In order to control the heat energy supplied to the first generator C, it is preferable to transmit the signal from the detector 20 so as to control the opening of the valve H by means of a control unit 34. Also, the supply of the weak solution from the absorber B may be controlled by the signal developed at the detector 20 through the control unit 34. These control systems are schematically illustrated by chain lines in FIG. 1. Of course, the control of the system may be performed by any other suitable means. Also, the control unit 34 may be devised to control the valves 32 and 33 rather than the valve 31.

Figure 2:
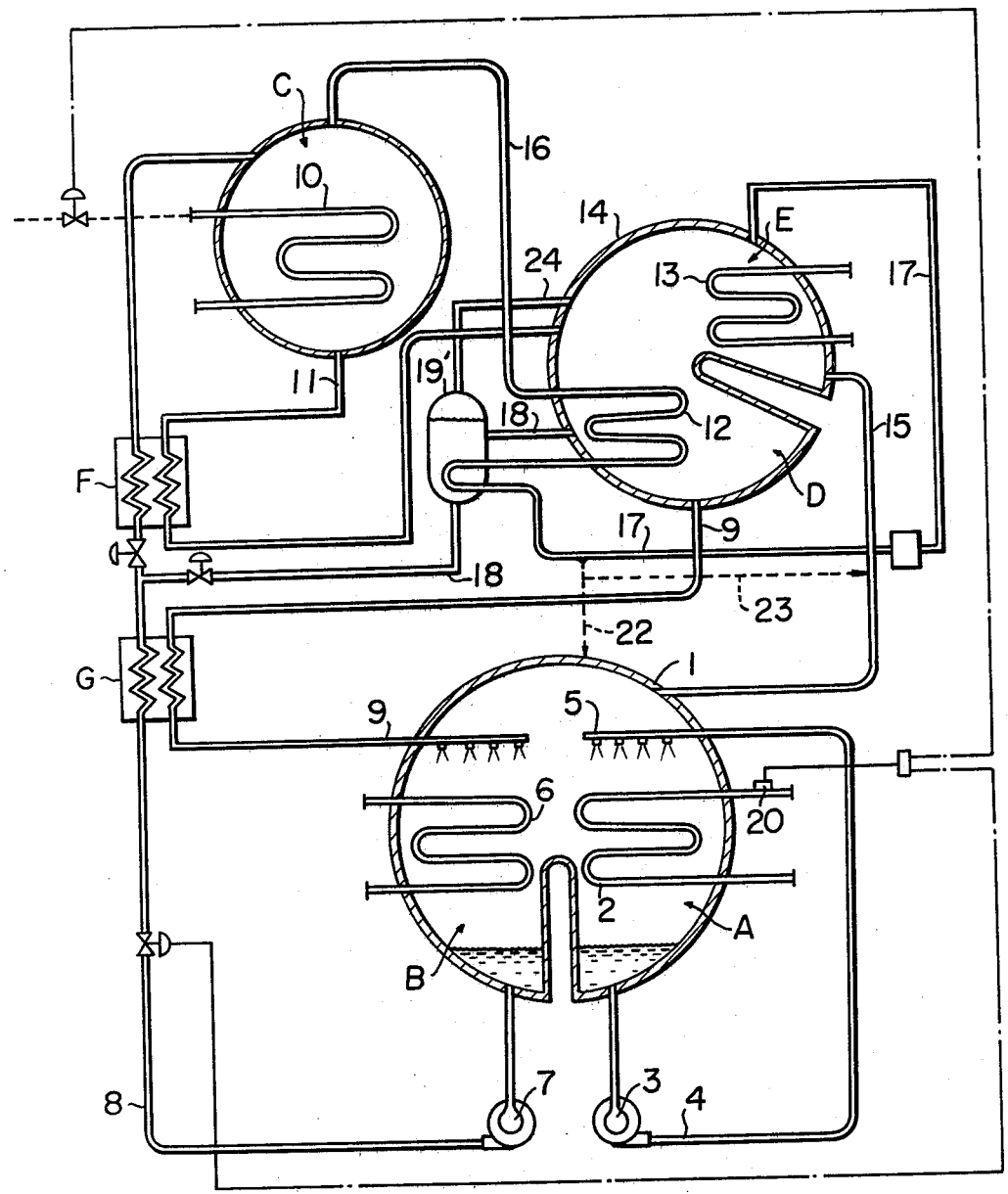
FIG. 2 is a view similar to FIG. 1 of another embodiment similar to that shown in FIG. 1 wherein a modification is made in the portion of a heat exchanger disposed in the bypass line.

In FIG. 2, there is shown an alternate embodiment of the present invention wherein the same references as those in FIG. 1 are applied to the elements and members performing the same function as in FIG. 1 and the numbers for elements similar to but slightly different from these in FIG. 1 have a prime added to the same reference as that in FIG. 1.

In the embodiment of FIG. 2, an additional passage or line 24 is provided so as to connect the third heat exchanger 19' to the drum 14. The boiling temperature of the solution becomes lower as the strength of the solution becomes weaker if the pressure is maintained constant. Therefore, at the internal pressure of the second generator D, the weak solution within the third heat exchanger 19', when it is heated, is easily brought to a boiling state when the capacity of the second heat exchanger G is large and, thus, a large volume of the refrigerant vapor is generated. The additional line 24 is provided for directing such refrigerant vapor to the condenser E. Contrary to this, in the embodiment of FIG. 1, if the solution in the third heat exchanger 19 becomes over-heated relative to the internal pressure of the second generator D, this would lower the heat transmitting efficiency; however, in the embodiment of FIG. 2, the heat transfer is promoted by boiling the solution in the third heat exchanger 19'.

Figure 3A:
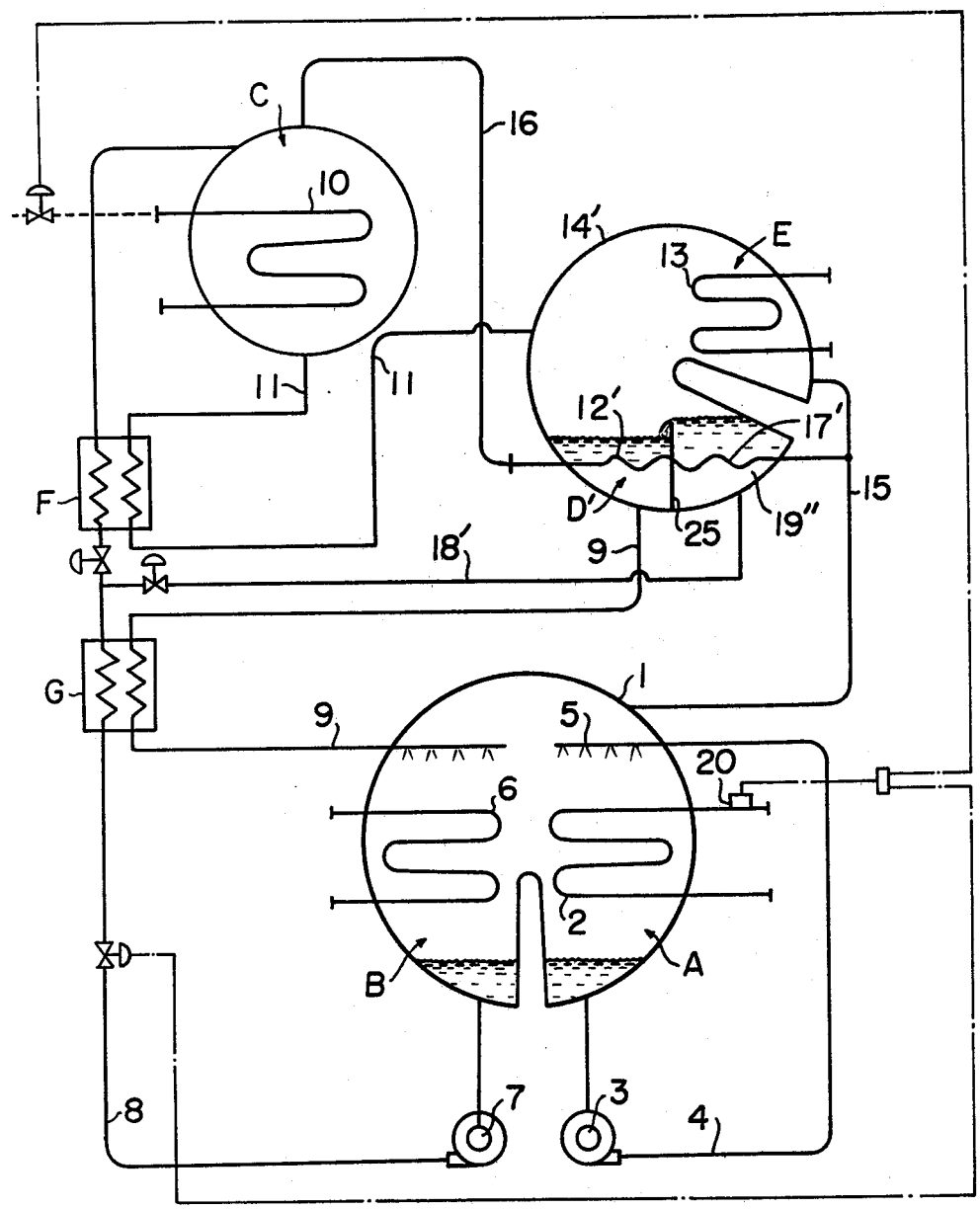
FIG. 3A is a schematic view of a further modification of the system wherein the heat exchanger in the bypass line is encompassed within a drum which comprises a low pressure or second generator and a condenser.

In FIG. 3A, there is shown a further modification of the system and the references are assigned on the same principle as in FIG. 2 relative to the foregoing embodiments illustrated in FIGS. 1 and 2. (This principle is also applied to the subsequent drawings.) In this embodiment, the third exchanger 19" is provided within a drum 14' in which the second generator D and the condenser E are formed. The third heat exchanger 19' is formed by disposing a separator 25 so as to divide the portion corresponding to that occupied by the second generator in FIG. 1 into a second generator portion D' and a third heat exchanger 19", and the bypass line 18' is arranged to direct the solution from the passage 8 to the upstream side of the heat exchanger 19" and the solution is passed through, this exchanger 19" towards the second generator D'. (The terms "upstream" and "downstream" are employed herein to mean with respect to the direction of flow of the solution within the heat exchanger or the heat exchanging portion.) The solution in the third heat exchanger 19" is strengthened by the refrigerant discharged from the second generator D' through a generator tube 12' and flowing through a refrigerant tube 17' within the heat exchanger 19". The refrigerant vapor discharged at the heat exchanger 19" is directed to the condenser E within the same drum 14'.

Figure 3B:
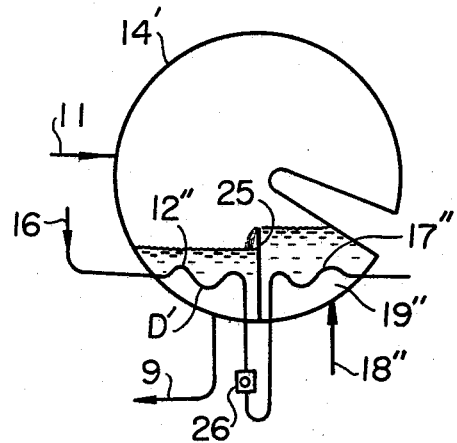
FIG. 3B is a schematic view of a still further modification of a portion of the heat exchanger schematically illustrated in the bypass line.

In FIG 3B, there is shown a drum 14" which is a further modification of the third heat exchanger of the system. In this modification, a trap 26 acting as liquid sealing means is disposed between a second generator tube 12" and a refrigerant tube 17" in the third heat exchanger 19" so as to selectively direct the liquid refrigerant to the heat exchanger 19" while stopping the passage of the vapor from the second generator tube 12". Of course, an orifice may be used in lieu of the trap for the same purpose.

Figure 3C:
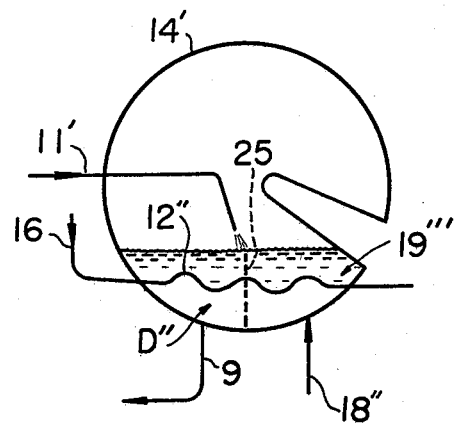
FIG. 3C schematically ilustrates another alternate heat exchanging device in the bypass line.

Further, the separator 25 in FIG. 3B may be omitted if the flow of the solution is taken into consideration. As shown in FIG. 3C, the separator 25 shown in dotted line may be removed by arranging the solution passage 11' from the first generator in such a way that the outlet of the passage 11' is positioned so as to direct the solution to the downstream side of the heat exchanger 19'" where it is mixed with the solution discharged from the heat exchanger or heat exchanging portion 19'" and the mixture of the solution enters the second generator or generating portion D".

As explained in detail with reference to the embodiments, the heat energy contained in the refrigerant delivered from of the second generator is recovered without wasting it in a coolant in the condenser whereby the corresponding amount of the heat energy otherwise required in the first generator is saved at the heat source whereby a remarkable improvement in thermal efficiency of the system is achieved. Further, due to the recovery of the heat energy heretofore wasted, the volume of the cooling medium required for the condenser is also reduced which may result in saving coolant whereby the associated equipment such as a cooling tower and a feed pump may be made smaller with respect to their respective capacities. Therefore the total power consumed by the system may also be reduced. Further, the concentration of the solution at the outlet portion of the second generator is also reduced thereby reducing the possibility of crystallization of the solution and assuring a stable and safe operation of the system by a simple construction such as explained above.

The present invention has been explained in detail referring to the preferred embodiments thereof; however, the present invention is mot limited to those explained and modifications and variations are easily realized by those skilled in the art within the scope of the present invention defined in the appended claims.

What is claimed is:

1. A double effect absorption refrigerating system comprising:
   an evaporator having therein a line for passing medium to be chilled;
   an absorber associated with the evaporator;
   a first generator associated with a heat source;
   a second generator;
   a condenser associated with said second generator;
   means for circulating solution from the absorber to the first generator and thence to the second generator and for returning the solution to the absorber;
   means for circulating refrigerant from the first generator to the evaporator through the second generator to the condenser and from at least one of the condenser and the portion of the refrigerant circulating means downstream of the second generator to the evaporator;
   means for bypassing a portion of the solution fed from the absorber to the first generator to the second generator; and
   a heat exchanger disposed in said bypassing means and arranged to effect heat transfer between the solution bypassed and the refrigerant passed through the second generator.

2. A double effect absorption refrigerating system as claimed in claim 1 further comprising
   a low level heat exchanger and a high level heat exchanger disposed in the solution circulating means so that the former effects heat transfer between the solution fed towards the first generator and the solution discharged from the second generator and the latter effects heat transfer between the solution passed through said low level heat exchanger and fed to said first generator and the solution discharged from said first generator, the heat exchanger disposed in said bypassing means constituting a third heat exchanger.

3. A double effect absorption refrigerating system as claimed in claim 2 wherein the solution bypassing means comprises means for bypassing the solution from the solution circulating means between the low level heat exchanger and the first generator.

4. A double effect absorption refrigerating system as claimed in claim 2 wherein
the solution bypassing means comprises means for bypassing the solution from the solution circulating means between the absorber and the high level heat exchanger.

5. A double effect absorption refrigerating system as claimed in claim 2 wherein the solution bypassing means comprises means for bypassing the solution from the solution circulating means between the low level and high level heat exchangers.

6. A double effect absorption refrigerating system as claimed in claim 2 wherein the third heat exchanger is an independent device.

7. A double effect absorption refrigerating system as claimed in claim 5 wherein said third heat exchanger disposed in said bypassing means is an independent device.

8. A double effect absorption refrigerating system as claimed in claim 7 wherein said third heat exchanger comprises means in which the solution may be boiled in the bypass line within the exchanger and means for directing the vaporized refrigerant to a space in the second generator communicating with the condenser.

9. A double effect absorption refrigerating system as claimed in claim 2 further comprising a drum in which said third heat exchanger is unitarily formed with the second generator and a separator between the second generator and said heat exchanger, said solution bypassing means introducing the bypassed solution from the upstream side of said heat exchanger to said separator.

10. A double effect absorption refrigerating system as claimed in claim 2 further comprising:
a temperature detector disposed at the outlet of the chilled medium line;
means for regulating said heat source; and
means for controlling said regulating means in response to the temperature detected by said detector.

11. A double effect absorption refrigerating system as claimed in claim 10 further comprising:
a flow regulating means disposed in the solution passage from the absorber to the first generator, said means being responsive to the temperature detected by said detector.

12. A double effect absorption refrigerating system as claimed in claim 2 further comprising a flow regulating valve disposed in said solution bypassing means and a second flow regulator valve disposed in the solution circulating means between the absorber and the first generator and downstream of the point where said bypassing is effected.

13. A double effect absorption refrigerating system as claimed in claim 2 further comprising a drum in which said third heat exchanger is unitarily formed with said second generator and said means for circulating said solution from said first generator introducing said solution to the downstream part of said third heat exchanger.

* * * * *